(12) United States Patent
He et al.

(10) Patent No.: US 12,529,409 B2
(45) Date of Patent: Jan. 20, 2026

(54) FLOATING TRAY MECHANISM AND ROBOT

(71) Applicant: Keenon Robotics Co., Ltd., Shanghai (CN)

(72) Inventors: Lin He, Shanghai (CN); Xianlin Liu, Shanghai (CN); Xuanlai Tang, Shanghai (CN)

(73) Assignee: Keenon Robotics Co., Ltd., Shanghai (CN)

( * ) Notice: Subject to any disclaimer, the term of this patent is extended or adjusted under 35 U.S.C. 154(b) by 57 days.

(21) Appl. No.: 18/531,564

(22) Filed: Dec. 6, 2023

(65) Prior Publication Data

US 2024/0102531 A1 Mar. 28, 2024

Related U.S. Application Data

(63) Continuation of application No. PCT/CN2022/097676, filed on Jun. 8, 2022.

(30) Foreign Application Priority Data

Jun. 11, 2021 (CN) .......................... 202110652805.4

(51) Int. Cl.
*F16F 15/02* (2006.01)
*F16M 13/02* (2006.01)

(52) U.S. Cl.
CPC ........... *F16F 15/022* (2013.01); *F16M 13/02* (2013.01)

(58) Field of Classification Search
CPC ...... F16M 13/00; F16M 13/02; F16M 13/022; F16F 15/022
See application file for complete search history.

(56) References Cited

U.S. PATENT DOCUMENTS

| | | | | |
|---|---|---|---|---|
| 5,553,820 A * | 9/1996 | Karten | .................... | F16M 13/00 248/181.2 |
| 6,244,678 B1 * | 6/2001 | Dopp | .................... | A47B 88/493 312/334.44 |
| 6,736,360 B1 * | 5/2004 | Buczek | .................... | A61B 50/33 248/278.1 |
| 8,210,548 B1 * | 7/2012 | Agyemang | ............ | A61B 50/13 280/47.35 |
| 8,474,771 B2 * | 7/2013 | Ross | ...................... | A61B 50/20 606/174 |
| 8,740,321 B2 * | 6/2014 | Yu | ........................ | A47B 88/493 312/334.8 |

(Continued)

Primary Examiner — Monica E Millner
(74) Attorney, Agent, or Firm — Westbridge IP LLC

(57) ABSTRACT

Disclosed are a floating tray mechanism and a robot. The floating tray mechanism includes a tray and a mounting bracket, the mounting bracket support the tray; the floating tray mechanism further comprises a floating contacting portion and a pulling rebounding portion, the floating contacting portion is provided on one of the tray and the mounting bracket, and the tray is movably supported on the mounting bracket, the pulling rebounding portion is configured to be able to pull the tray back to an initial position of translation when the tray moves relative to the mounting bracket. In the present application, the tray will have a damping relative stroke and a recovery relative stroke relative to the robot when a robot suddenly stops or suddenly speeds up, which greatly reduces the inertial motion of the goods, and thus the fluid goods will not spill out of the tray.

18 Claims, 14 Drawing Sheets

(56) References Cited

U.S. PATENT DOCUMENTS

| | | | |
|---|---|---|---|
| 10,124,706 B2 * | 11/2018 | Zimmermann | A47B 88/487 |
| 10,813,531 B2 * | 10/2020 | Hansen | A47L 15/507 |
| 2008/0142658 A1 * | 6/2008 | Jurja | F16M 13/00 |
| | | | 248/220.21 |
| 2017/0029034 A1 * | 2/2017 | Faruque | H01M 50/249 |
| 2019/0234482 A1 * | 8/2019 | Embleton | F16F 15/022 |
| 2020/0182398 A1 * | 6/2020 | Aston | B64C 1/00 |

\* cited by examiner

FLOATING TRAY MECHANISM AND ROBOT

CROSS-REFERENCE TO RELATED APPLICATIONS

This application is a continuation of International Application No. PCT/CN2022/097676, filed on Jun. 8, 2022, which claims priority to Chinese Patent Application No. 202110652805.4, filed on Jun. 11, 2021. All of the aforementioned applications are incorporated herein by reference in their entireties.

TECHNICAL FIELD

The present application relates to the mechanical technical field, and specifically to a floating tray mechanism and a robot.

BACKGROUND

With the rapid development of robot technologies, robots are more and more widely used, for example, greeter robot, meal delivery robot, education robot, bionic robot, etc. A robot is a machine device automatically performing work. It can receive a human command, run pre-programmed programs, and act following the rules prescribed in term of artificial intelligence technologies. Various mobile robot chassises gradually come into view. In the prior art, there are various mobile robot chassises with suspension.

Currently, in the process of delivery, the robot will inevitable encounter some obstacle crossing or urgent obstacle avoidance cases, which will cause the robot to brake suddenly or speed up as a whole. During such process, the goods to be delivered by the robot would move relative to the tray supporting the goods and thus disengage from the tray. In particular, for some fluid goods, such as dining soup or drink, they are usually spilled out due to sudden braking or speeding up of the robot or due to poor road condition, etc.

Therefore, there is an urgent need for a robot tray mechanism and a robot to solve the above technical problem.

SUMMARY

The purpose of the present application is to provide a floating tray mechanism and a robot, to solve the problem that the goods is easily detached from the tray or fluid is easily spilled when the robot deliver the goods.

To achieve this purpose, the following technical solutions are used in the present application:

In the present application, a floating tray mechanism is provided, comprising a tray and a mounting bracket, the mounting bracket support the tray to be mounted on a robot frame; the floating tray mechanism further comprises a floating contacting portion and a pulling rebounding portion, the floating contacting portion is provided on one of the tray and the mounting bracket and the tray is movably supported on the mounting bracket through the floating contacting portion, the pulling rebounding portion is configured to be able to pull the tray back to an initial position of translation when the tray moves relative to the mounting bracket.

Optionally, the mounting bracket is provided with the floating contacting portion and the pulling rebounding portion, the floating contacting portion is in point-surface contact or surface-surface contact with the tray, and the pulling rebounding portion is connected to the tray and is able to make the tray back to the initial position of translation by rebounding force.

Optionally, the floating contacting portion comprises a sliding friction layer which is in surface-surface contact with the tray.

Optionally, the sliding friction layer is a Teflon plate and is fixedly mounted to an upper surface of the mounting bracket, and a lower surface of the tray is slidably pressed on the Teflon plate.

Optionally, the mounting bracket comprises a mounting support plate for supporting the tray, and the mounting support plate is provided with a floating mounting hole; the floating contacting portion comprises a ball support seat and a universal ball, the ball support seat is locked and mounted to the floating mounting hole, the universal ball is rotatably mounted on the ball support seat, and the tray is slidably supported on the universal ball.

Optionally, a damping cushion is provided at a contact portion between a lower surface of the tray and the universal ball.

Optionally, the pulling rebounding portion comprises an elastic material in a strip shape, one end of the elastic material is fixedly connected to a lower surface of the mounting bracket and the other end is fixedly connected to a lower surface of the tray, and the tray is simultaneously pulled and pressed through the elastic material.

Optionally, the elastic material is a tension spring or a bent elastic rubber.

Optionally, the mounting bracket comprises a mounting support plate for supporting the tray, and the mounting support plate is provided with a rebounding mounting port; the pulling rebounding portion comprises an elastic pulling element, one end of the elastic pulling element is movably mounted to the rebounding mounting port and the other end is connected to a lower surface of the tray.

Optionally, the mounting bracket comprises a mounting support plate for supporting the tray, and the mounting support plate is provided with a rebounding mounting port; the pulling rebounding portion comprises a connecting shaft and a rebounding cushion, one end of the connecting shaft is movably arranged in the rebounding mounting port and the other end fixedly connected to a lower surface of the tray, and the rebounding cushion is arranged between the rebounding mounting port and the connecting shaft.

Optionally, a cavity groove body is fixedly mounted at the rebounding mounting port, the end of the connecting shaft far from the tray is movably arranged in the cavity groove body, the rebounding cushion is annularly arranged between the connecting shaft and a cavity inner wall of the cavity groove body, the rebounding cushion is configured to be pressed to deform with movement of the connecting shaft until the deformation is restored, and the tray turns to the initial position of movement through the rebounding cushion.

Optionally, a ring sleeve is fixedly mounted at the rebounding mounting port, the end of the connecting shaft far from the tray passes through the ring sleeve and the end of the connecting shaft passing through out of the ring sleeve is provided with a flange cover, the rebounding cushion is annularly arranged between the connecting shaft and an inner wall of the ring sleeve, and the flange cover presses against and covers an end of the ring sleeve.

Optionally, the tray is provided with a rebounding mounting port; the pulling rebounding portion comprises a connecting shaft and a rebounding cushion, one end of the connecting shaft is movably arranged in the rebounding mounting port and the other end fixedly is connected to the mounting bracket, and the rebounding cushion is arranged between the rebounding mounting port and the connecting shaft.

Optionally, the floating contacting portion comprises a ball support seat and a universal ball rotatably mounted on the ball support seat; the ball support seat is provided on one of the mounting bracket and the tray, and the other of the mounting bracket and the tray is movable relative to the universal ball.

Optionally, the floating contacting portion comprises a sliding friction layer provided on one of the mounting bracket and the tray, and the other of the mounting bracket and the tray is movable relative to the sliding friction layer.

Optionally, the floating tray mechanism further comprises a limiting clamping element for preventing disengagement of the tray from the mounting bracket.

Optionally, the limiting clamping element is a limiting clamping block which is fixed to the lower surface of the tray and comprises a horizontally extended clamping mouth section, with a clamping mouth gap between the clamping mouth section and the tray, the clamping mouth section is configured to clamp a mounting support plate of the mounting bracket below, and then the tray limits the mounting bracket through the clamping mouth gap.

Optionally, two opposite sides of the tray are respectively provided with the floating contacting portions, and two opposite sides of the tray are respectively provided with the respective pulling rebounding portions.

Optionally, the pulling rebounding portion is arranged corresponding to a middle position of the tray, and multiple floating contacting portions are arranged around the pulling rebounding portion at intervals.

According to the other aspect of the present application, a robot is provided, comprising a body frame and the floating tray mechanism as described above, wherein the mounting bracket of the floating tray mechanism is mounted to the body frame.

The beneficial effects of the technical solution(s) as provided in the present application comprise:

In the present application, the floating contacting portion and the pulling rebounding portion are added on the mounting structure (the mounting bracket) for the tray to form a sliding fulcrum and a rebounding fulcrum respectively, and the two fulcrums with different functions support and connect the tray, the tray is not fixed any more, but can float relative to the robot body frame. Thus, when a robot suddenly stops or suddenly speeds up, there will be a damping relative stroke and a recovery relative stroke for the tray relative to the robot instead of a hard sudden change, thus the inertial motion of the goods is greatly reduced, and thus the fluid item will not spill out of the tray, effectively ensuring quality of delivery by the robot.

In the present application, for the specific structural forms of the floating contacting portion and the pulling rebounding portion, five different practicable implementation solutions are provided, they are low in material cost and each can make the tray smoothly slide and return to the initial position.

DETAILED DESCRIPTION OF THE EMBODIMENTS

Figure 1:
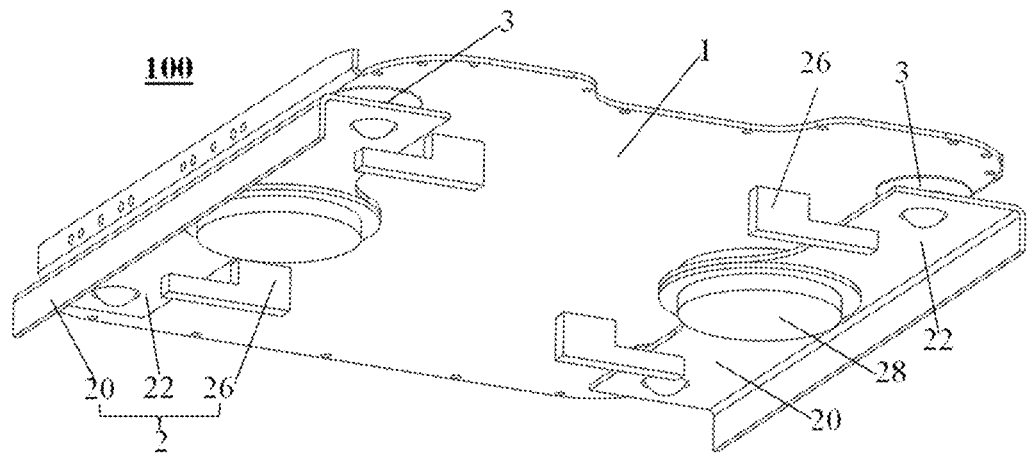
FIG. 1 is a perspective view of a floating tray mechanism as provided in a first embodiment of the present application.

Hereinafter, the present application will be further explained in detail in combination with accompanying drawings and embodiments. It is understandable that the specific embodiments as described herein are used only for explaining the present application, rather than limiting the present application. In addition, it should be noted that in order to facilitate description, only portions related to the present application, rather than all the structures, are illustrated in the accompanying drawings.

In the description of the present application, unless otherwise clearly specified or defined, the terms of "connect", "couple", "fix" should be understood in a broad sense. For example, it may be a fixed/permanent connection, or a removable connection, or an integrated formation, it may be a mechanical connection, or an electrical connection; it may be a direct connection, or an indirect connection via an intermediate medium; and it may be communication between inner portions of two elements, or interaction relationship between two elements. For those ordinary skilled in the art, the specific meanings of the above terms in the present application are understandable according to specific cases.

In the present application, unless otherwise clearly specified or defined, if a first feature is "above" or "below" a second feature, it may comprise a case that the first and second features are in direct contact, or may comprise a case that the first and second features are not in direct contact, but are in contact via another feature there between. Moreover, if a first feature is "above" or "on" or "over" a second feature, it may comprise cases that the first feature is directly above or obliquely above the second feature, or it may only mean that the first feature is in a level/height larger than the second feature. If a first feature is "below" or "under" or "beneath" a second feature, it may comprise cases that the first feature is directly below or obliquely below the second feature, or it may only mean that the first feature is in a level/height less than the second feature.

In the description of the present embodiments, the terms of "upper", "lower", "right", or the like to represent azimuth or position relationship are based on the azimuth or position relationship as shown in the figures, only for facilitating description and operation simplification, rather than indicating or hinting that the mentioned device or element must have a specific azimuth, or be configured or operate in a specific azimuth, and thus should not be understood as limitation to the present application. In addition, the terms of "first" and "second" are used only to distinguish in the description, without any special meaning.

As provided in the prior art, the tray of the robot is generally fixedly mounted on the robot. When a robot delivering a fluid goods suddenly stops or speeds up, there will be a problem that the goods is prone to spill out due to sudden shaking, which may thus affect quality of delivery by the robot. In order to solve the above problem, the present embodiment provide a floating tray mechanism/module which can effectively buffer the goods (on the original tray) to be delivered and ensure that the goods (especially fluid) to be delivered will not spill out due to shaking.

In the present application, a floating tray mechanism is provided. As shown in FIGS. 1-26, the floating tray mechanism comprises a tray 1 and a mounting bracket 2, the mounting bracket 2 support the tray 1 to be mounted on a robot frame; the floating tray mechanism further comprises a floating contacting portion 3 and a pulling rebounding portion 4, the floating contacting portion 3 is provided on one of the tray 1 and the mounting bracket 2, and the tray 1 is movably supported on the mounting bracket 2 through the floating contacting portion 3, the pulling rebounding portion 4 is configured to be able to pull the tray 1 back to an initial position of translation when the tray 1 moves relative to the mounting bracket 2.

In use, the mounting bracket 2 of the floating tray mechanism is mounted to a robot. The robot drives the mounting bracket 2 to move to deliver the goods carried on the tray 1.

In the technical solution(s) as provided in the present application, by providing the floating contacting portion 3 and the pulling rebounding portion 4 between the tray 1 and the mounting bracket 2, the tray 1 can be slidably supported on the mounting bracket 2 through the floating contacting portion 3. When the robot suddenly stops, suddenly speeds up, or turns, or the road surface is rugged, the tray 1 will have a relative damping stroke relative to the robot due to inertia, that is, the tray 1 slides relative to the mounting bracket 2, which can prevent a large inertial motion of the item on the tray 1 relative to the tray 1, thus preventing disengagement of the item from the tray 1, especially for the fluid item, it can prevent the fluid item to spill out of the tray. Then, the tray 1 returns in the opposite direction to the initial position by the pulling rebounding portion 4. In the cases when the robot suddenly stops, suddenly speeds up, or turns again, or when the road surface is rugged, the tray 1 moves relative to the mounting bracket 2 again, and then returns to the initial position by the pulling rebounding portion again.

Therefore, the technical solution(s) as provided in the present application can greatly reduce the cases of disengagement of the item from the tray due to inertial motion of the item relative to the tray when the robot delivers goods, thus effectively ensuring quality of delivery by the robot.

In some embodiments, the mounting bracket 2 is provided with the floating contacting portion 3 and the pulling rebounding portion 4, the floating contacting portion 3 is in point-surface contact or surface-surface contact with the tray 1, and the pulling rebounding portion 4 is connected with the tray 1 and can make the tray 1 back to the initial position of translation by rebounding force.

In some embodiments, the mounting bracket 2 comprises a mounting support plate 20 for supporting the tray 1, and the mounting support plate 20 is provided with a floating mounting hole 22; the floating contacting portion 3 comprises a ball support seat 30 and a universal ball 32, the ball support seat 30 is locked and mounted to the floating mounting hole 22, the universal ball 32 is rotatably mounted on the ball support seat 30, and the tray 1 is slidably supported on the universal ball 32 (referring to Embodiment 1 as described below).

Optionally, a damping cushion is provided at a contact portion between a lower surface of the tray 1 and the universal ball 32, to reduce noise caused by hard friction or up-down vibration between the tray 1 and the universal ball 32.

In some embodiments, the floating contacting portion 3 comprises a sliding friction layer which is in surface-surface contact with the tray 1 (referring to Embodiment 2 as described below). Optionally, the sliding friction layer is a Teflon plate and is fixedly mounted to an upper surface of the mounting bracket 2, and a lower surface of the tray 1 is slidably pressed on the Teflon plate.

In the technical solution(s) as provided in the present application, the pulling rebounding portion 4 may use structures in various forms, as long as it can pull the tray 1 to make it back to the initial position.

In some embodiments, the pulling rebounding portion 4 comprises an elastic material 46 in a strip shape, one end of the elastic material 46 is connected to a lower surface of the mounting bracket 2 and the other end is connected to a lower surface of the tray 1, the mounting bracket 2 is pressed on the tray 1 through the elastic material 46, that is, the tray 1 is simultaneously pulled and pressed by the elastic material (referring to Embodiment 5 as described below).

Optionally, the elastic material 46 is a tension spring or a bent elastic rubber.

In some embodiments, the mounting bracket 2 comprises a mounting support plate 20 for supporting the tray 1, and the mounting support plate 20 is provided with a rebounding mounting port 24; the pulling rebounding portion 4 comprises an elastic pulling element, one end of the elastic pulling element is movably mounted to the rebounding mounting port 24 and the other end of the elastic pulling element is connected to a lower surface of the tray 1.

In some embodiments, the mounting bracket 2 comprises a mounting support plate 20 for supporting the tray 1, and the mounting support plate 20 is provided with a rebounding mounting port 24; the pulling rebounding portion 4 comprises a connecting shaft 40 and a rebounding cushion 42, one end of the connecting shaft 40 is movably arranged in the rebounding mounting port 24 and the other end is fixedly connected to a lower surface of the tray 1, and the rebounding cushion 42 is arranged between the rebounding mounting port 24 and the connecting shaft 40.

Optionally, a cavity groove body 28 is fixedly mounted at the rebounding mounting port 24, the end of the connecting shaft 40 far from the tray 1 is movably provided in the cavity groove body 28, the rebounding cushion 42 is annularly arranged between the connecting shaft 40 and a cavity inner wall of the cavity groove body 28, the rebounding cushion 42 is configured to be pressed to deform with movement of the connecting shaft 40 until the deformation is restored, and the tray 1 returns to the initial position through the rebounding cushion 42.

Optionally, a ring sleeve 29 is fixedly mounted at the rebounding mounting port 24, the end of the connecting shaft 40 far from the tray 1 passes through the ring sleeve 29 and the end of the connecting shaft 40 passing through out of the ring sleeve 29 is provided with a flange cover 44, the rebounding cushion 42 is annularly arranged between the connecting shaft 40 and an inner wall of the ring sleeve 29, and the flange cover 44 presses against and covers an end of the ring sleeve 29.

In some embodiments, the tray 1 is provided with a rebounding mounting port 24; the pulling rebounding portion 4 comprises a connecting shaft 40 and a rebounding cushion 42, one end of the connecting shaft 40 is movably arranged in the rebounding mounting port 24 and the other end is fixedly connected to the mounting bracket 2, and the rebounding cushion 42 is arranged between the rebounding mounting port 24 and the connecting shaft 40.

In some embodiments, the floating contacting portion 3 comprises a ball support seat 30 and a universal ball 32 rotatably mounted on the ball support seat 30; the ball support seat 30 is provided on one of the mounting bracket 2 and the tray 1, and the other of the mounting bracket 2 and the tray 1 is movable relative to the universal ball 32. That is, the ball support seat 30 mounted with the universal ball 32 may be mounted on the mounting bracket 2, or may be mounted on the tray 1. Herein, the ball support seat 30 may be mounted through the above-mentioned floating mounting hole 22, or may be mounted in another manner (for example, fixing with a bolt).

In some embodiments, the floating contacting portion 3 comprises a sliding friction layer provided on one of the mounting bracket 2 and the tray 1, and the other of the mounting bracket 2 and the tray 1 is movable relative to the sliding friction layer.

In some embodiments, the floating tray mechanism further comprises a limiting clamping element for preventing disengagement of the tray 1 from the mounting bracket 2. In cases when the robot shakes or the road surface is rugged, the limiting clamping element can prevent the tray 1 from moving upwards and disengaging from the mounting bracket 2.

Optionally, the limiting clamping element is a limiting clamping block 26 which is fixed to the lower surface of the tray 1 and comprises a horizontally extended clamping mouth section, with a clamping mouth gap between the clamping mouth section and the tray 1, the clamping mouth section is configured to clamp a mounting support plate 20 of the mounting bracket 2, and then the tray 1 limits the mounting bracket 2 through the clamping mouth gap, thus preventing disengagement of the tray 1 from the mounting bracket 2.

In the technical solution(s) as provided in the present application, the floating contacting portion 3 and the pulling rebounding portion 4 may be arranged in various manners, which are not limited herein.

In some embodiments, two opposite sides of the tray 1 is provided respectively with the floating contacting portions 3, and two opposite sides of the tray 1 is provided respectively with the respective pulling rebounding portions 4.

In some embodiments, the pulling rebounding portion 4 is arranged corresponding to a middle position of the tray 1, and multiple floating contacting portions 3 are arranged around the pulling rebounding portion 4 at intervals.

Hereinafter, the specific embodiments of the present application will be described in detail with reference to FIGS. 1-26.

The embodiments shown in FIGS. 1-26 focus on providing a floating tray mechanism 100 comprising a tray 1 and a mounting bracket 2, the mounting bracket 2 support the tray 1 to be mounted on a robot frame; the mounting bracket 2 is provided with a floating contacting portion 3 and a pulling rebounding portion 4. The floating contacting portion 3 comprises a sliding fulcrum on which the tray 1 is slidably supported and can translate freely relative to the mounting bracket 2. The pulling rebounding portion 4 comprises a rebounding fulcrum with which the tray 1 is connected and can return to the initial position of translation.

Herein, the mounting bracket 2 comprises a mounting support plate 20 provided below the tray 1. The sliding fulcrum is in point-surface contact or surface-surface contact with the tray 1, and the rebounding fulcrum is in pulling connection with the tray 1.

Certainly, the floating contacting portion 3 and the pulling rebounding portion 4 can also be mounted to the lower surface of the tray 1 (with an inverted structure and without being limited to the mounting bracket 2), such that the upper surface of the mounting bracket 2 is in sliding contact with the lower surface of the tray 1.

Hereinafter, regarding how to form respective sliding fulcrum and rebounding fulcrum for the floating contacting portion 3 and the pulling rebounding portion 4, different embodiments are provided respectively.

Embodiment 1

As shown in FIGS. 1-6, in the present embodiment, a floating tray mechanism 100 is provided, wherein the mounting bracket 2 comprises a mounting support plate 20 supporting the tray 1 from below. The floating contacting portion 3 uses the sliding fulcrum in a ball shape and thus is in point-surface contact with the tray 1. The pulling rebounding portion 4 uses the rebounding fulcrum in a cylindrical ring shape and thus pulls the tray 1. The mounting support plate 20 is provided with a floating mounting hole 22 and a rebounding mounting port 24, respectively. The floating contacting portion 3 is removably mounted to the floating mounting hole 22, and the pulling rebounding portion 4 is removably mounted to the rebounding mounting port 24.

Figure 2:
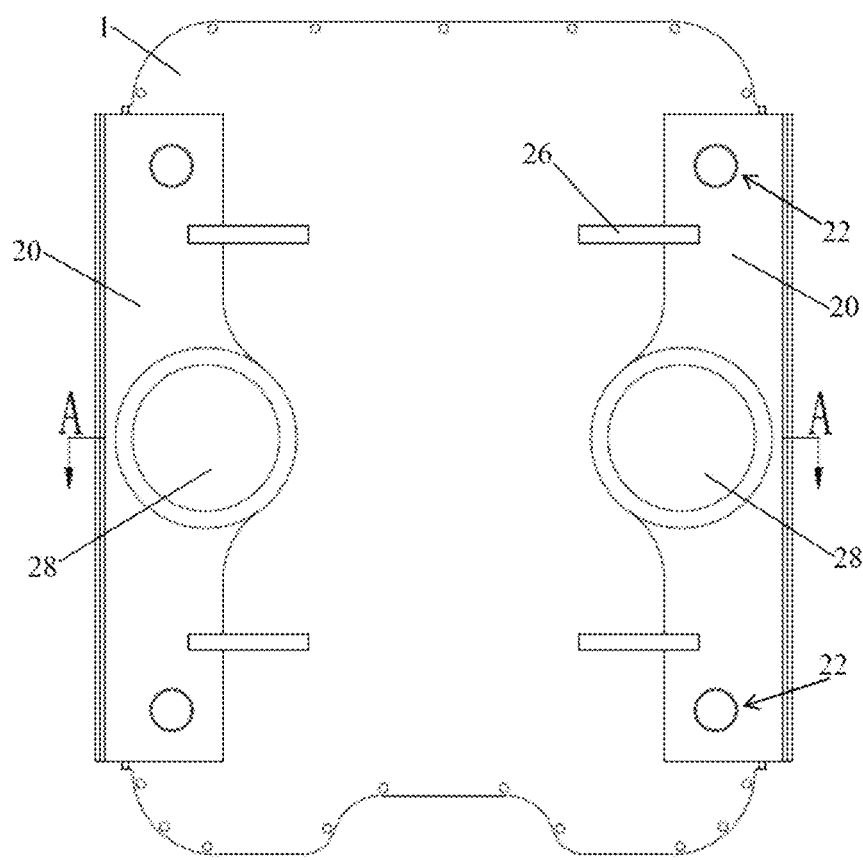
FIG. 2 is a bottom view of the structure corresponding to FIG. 1.

Herein, as shown in FIGS. 1 and 2, two mounting support plates 20 are arranged to support two sides of the tray 1, both ends of each mounting support plate 20 are respectively provided with floating mounting holes 22, and the middle position of each mounting support plate 20 (between the two floating mounting holes 22) is provided with a rebounding mounting port 24.

Further, in order to prevent disengagement of the tray from the mounting support plate 20 due to relatively strong shock, in the present embodiment, as shown in FIGS. 1 and 2, the tray 1 is limited on the mounting support plate 20 by a limiting clamping element. Specifically, the limiting clamping element is a limiting clamping block 26 which is fixed to a lower surface of the tray 1 and comprises a horizontally extended clamping mouth section, with a clamping mouth gap between the clamping mouth section and the tray 1. The clamping mouth section is arranged below the mounting support plate 20, and then the tray limits the mounting bracket 2 by the clamping mouth gap such that the tray 1 cannot disengage from the mounting bracket 2.

Figure 3:
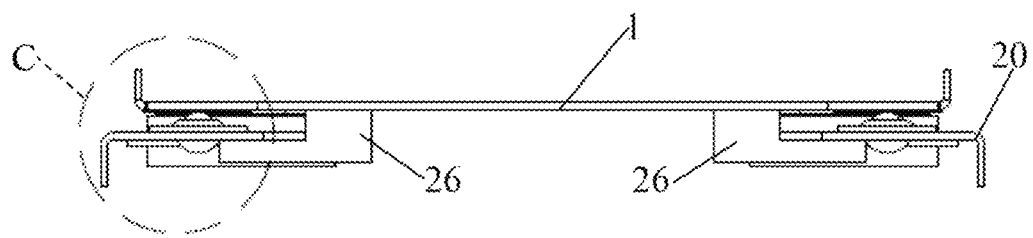
FIG. 3 is a front view of the structure corresponding to FIG. 1.
Figure 4:
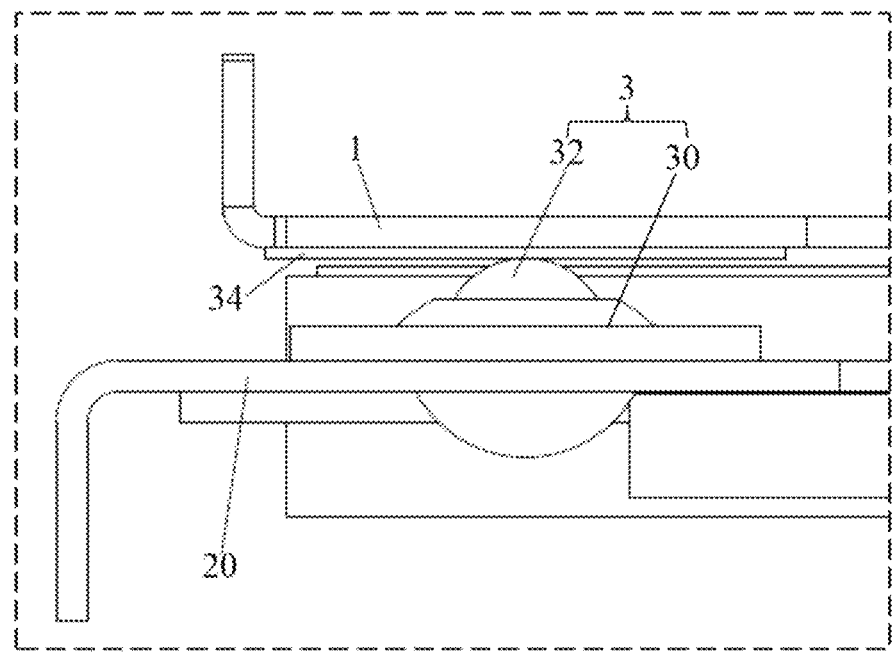
FIG. 4 is an enlarged structural diagram corresponding to C in FIG. 3.

In the present embodiment, specifically, as shown in FIGS. 3 and 4, the floating contacting portion 3 comprises a ball support seat 30 and a universal ball 32, the ball support seat 30 is locked and mounted to the floating mounting hole 22, the universal ball 32 is rotatably mounted on the ball support seat 30 and in turn serves as the sliding fulcrum protruding above the mounting support plate 20, and the tray 1 is slidably supported on the universal ball 32. Certainly, it is also possible for the ball support seat 30 and the universal ball 32 in the present application to be mounted to the lower surface of the tray 1, without being limited to the mounting support plate 20, such that the relative sliding between the tray 1 and the mounting bracket 2 can be similarly formed.

Further, as shown in FIG. 4, a damping cushion 34 is provided at a contact portion between a lower surface of the tray 1 and the universal ball 32. Preferably, a rubber cushion or a sponge cushion is used.

In the present embodiment, the tray 1 is supported on the universal ball 32 and then forms a sliding fitting relationship of point-surface contact with the mounting support plate 20, so that the tray 1, together with the fluid goods will perform a damping movement relative to the robot under inertia effect, thus preventing the fluid goods from spilling out of the tray 1. Also, the damping cushion 34 can effectively reduce noise caused by hard friction or up-down vibration between the tray 1 and the universal ball 32.

On the other hand, in order to gradually reduce the inertia of the tray 1 and the fluid goods and make them return to the initial position, the pulling rebounding portion 4 is further improved in structure in the present application.

Figure 5:
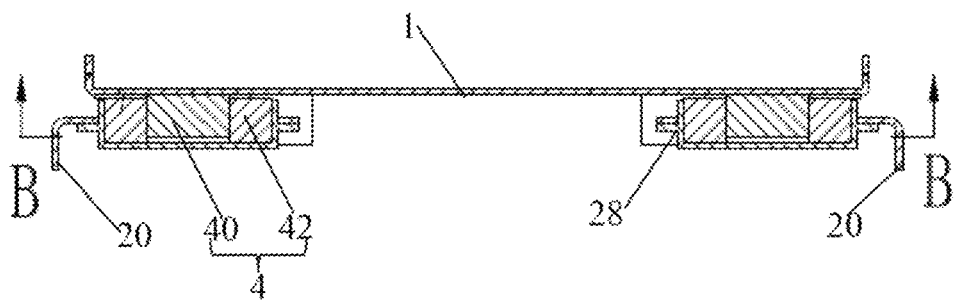
FIG. 5 is a section view of the structure corresponding to A-A in FIG. 2.
Figure 6:
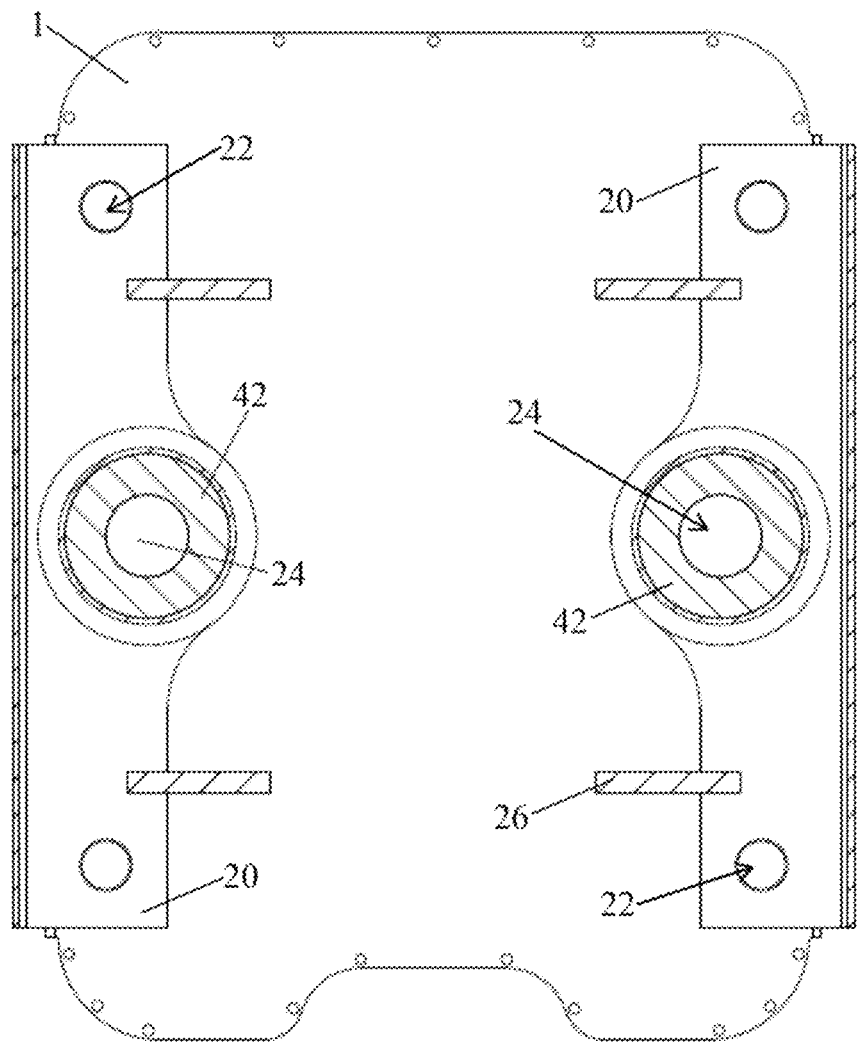
FIG. 6 is a section view of the structure corresponding to B-B in FIG. 5.
Figure 7:
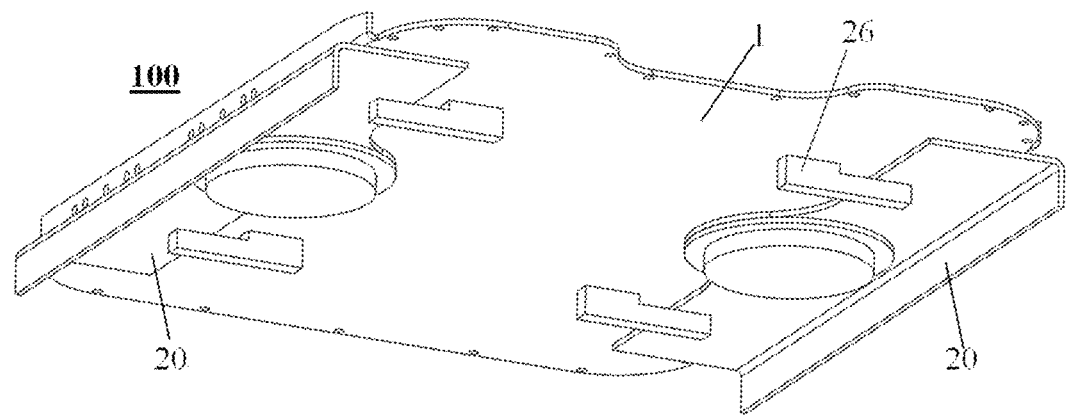
FIG. 7 is a perspective view of a floating tray mechanism as provided in a second embodiment of the present application.
Figure 8:
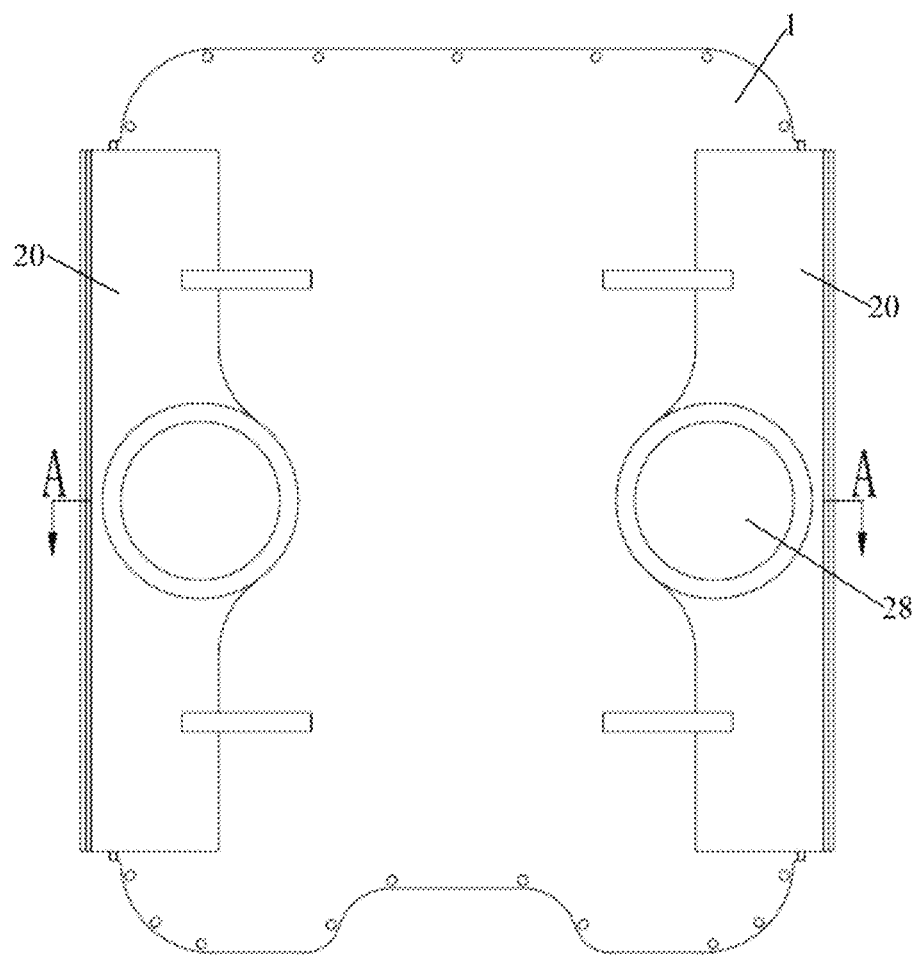
FIG. 8 is a bottom view of the structure corresponding to FIG. 7.
Figure 9:
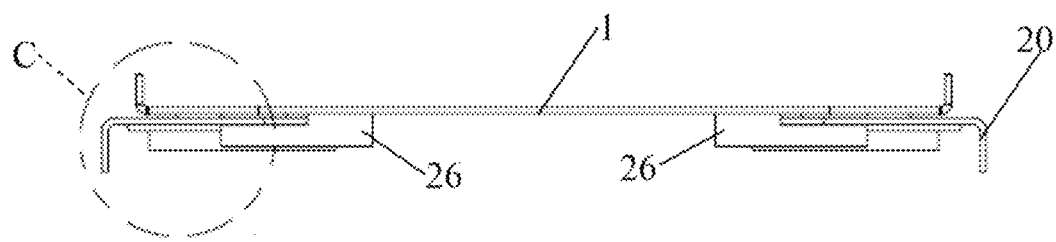
FIG. 9 is a front view of the structure corresponding to FIG. 7.
Figure 10:
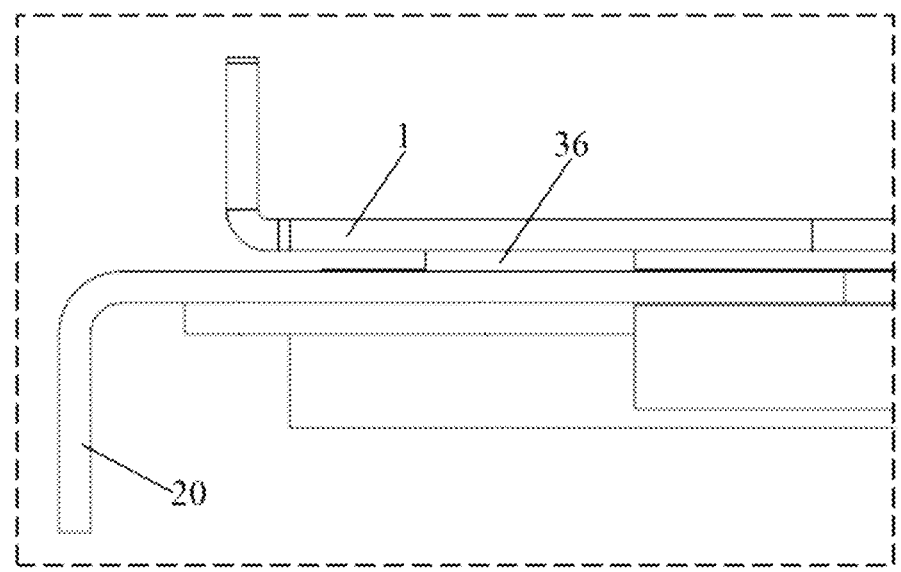
FIG. 10 is an enlarged structural diagram corresponding to C in FIG. 9.
Figure 11:
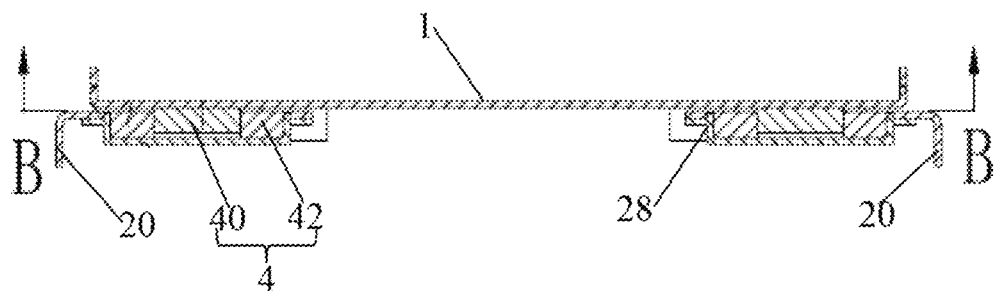
FIG. 11 is a section view of the structure corresponding to A-A in FIG. 8.
Figure 12:
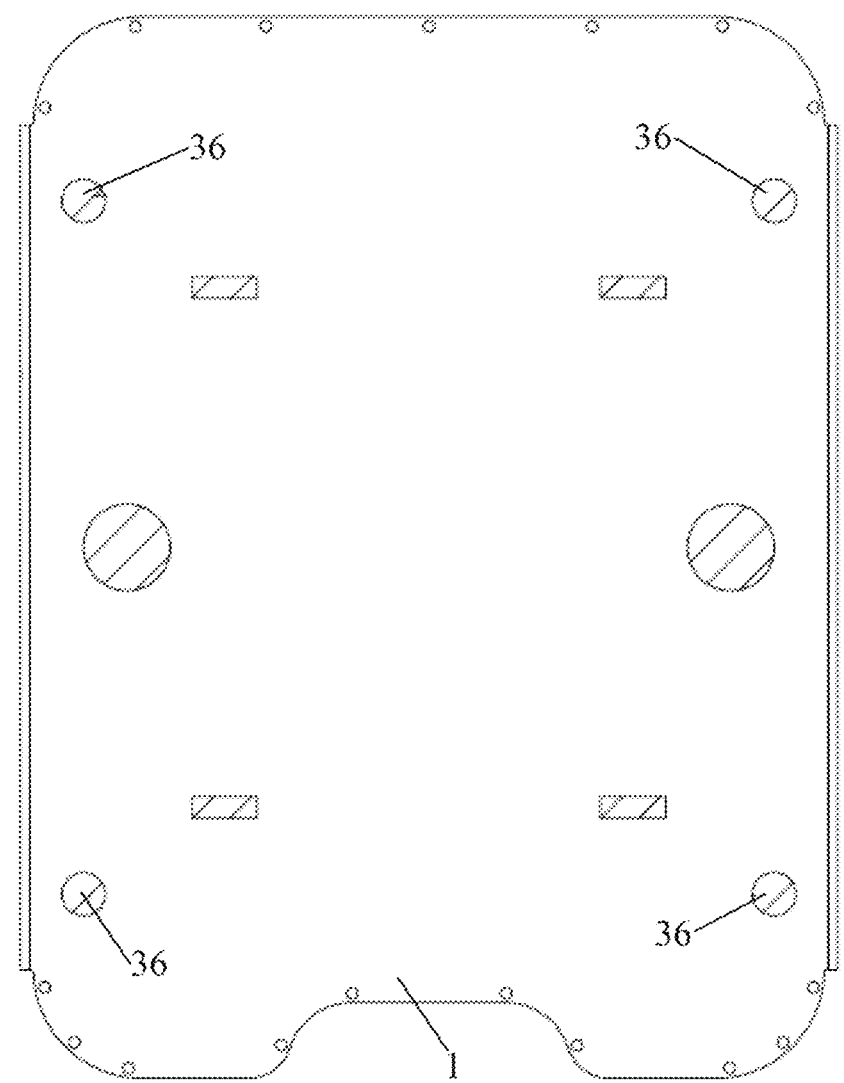
FIG. 12 is a section view of the structure corresponding to B-B in FIG. 11.

In the present embodiment, as shown in FIGS. 2, 5 and 6, the pulling rebounding portion 4 comprises an elastic pulling element, one end of the elastic pulling element is movably mounted to the rebounding mounting port 24 (as show in FIG. 6) and the other end is connected to a lower surface of the tray 1. Herein, the elastic pulling element may be an integrated member, or may be a detachable assembly. For example, the elastic pulling element may be a rebounding column with one end connected to the tray 1 and the other end mounted to the rebounding mounting port 24.

Further, referring to FIG. 5, in the present embodiment, the elastic pulling element comprises a connecting shaft 40 and a rebounding cushion 42. The connecting shaft 40 serves as the rebounding fulcrum, one end of the connecting shaft 40 is movably mounted in the rebounding mounting port 24 and the other end is fixedly connected with a lower surface of the tray 1. The rebounding cushion 42 is interposed between the rebounding mounting port 24 and the connecting shaft 40. Relatively preferably, the rebounding cushion 42 can be made of materials like foamed rubber, foamed silica gel, sponge, or air bladder, etc. These materials have relatively excellent resilience and form relatively large deformation damping, and thus the vibration and inertial shaking can be better attenuated.

In order to mount and configure the pulling rebounding portion 4, a cavity groove body 28 is fixedly mounted at the rebounding mounting port 24, the connecting shaft 40 is movably arranged in the cavity groove body 28 and is connected to the tray 1, the rebounding cushion 42 is annularly arranged between the connecting shaft 40 and a cavity inner wall of the cavity groove body 28, the rebounding cushion 42 can be pressed to deform with the movement of the connecting shaft 40 until the deformation is restored, and the tray 1 returns to the initial position of movement through the rebounding cushion 42.

Thus, when the tray 1 and the fluid goods move under inertia, they will be elastically pulled by the pulling rebounding portion 4 continuously and the inertial kinetic energy will be gradually decreased. With the elastic deformation restored, the tray 1 will finally return to the initial position, without changing the placement position due to inertia, thus avoiding an unstable gravity center of the goods as placed.

In order to facilitate material acquisition, assembling and replacement, in the present embodiment, any single structure element is a currently available product. Also, both the assembling form and the connecting manner facilitate on-site operation and implementation.

Embodiment 2

Based on Embodiment 1, in the present embodiment, the floating contacting portion 3 in another structural form is provided.

The improved difference from Embodiment 1 is that, as shown in FIGS. 7-12, the floating contacting portion 3 provided in the present embodiment uses a sliding friction layer as the sliding fulcrum, and in turn forms surface-surface contact with the tray 1.

In the present embodiment, relatively preferably, as shown in FIGS. 9-12, the sliding friction layer is a Teflon plate 36 and is fixedly mounted to the two ends of the upper surface of the mounting support plate 20. The lower surface of the tray 1 is slidably pressed on the Teflon plate 36. Certainly, the sliding friction layer can also use nylon or other materials, not limited to tetrafluoroethylene (P T F E) material.

By using the Teflon plate 36 instead of the universal ball 32 to reduce friction between the tray 1 and the mounting bracket 2, the damping cushion 34 (rubber cushion or sponge cushion) arranged below the tray 1 in Embodiment 1 can be omitted.

Other structures are configured to be substantially same as those in Embodiment 1, and will not be described repeatedly herein.

Thus, the tray 1 can rebound and float in any direction in the horizontal plane relative to the robot frame. Therefore, when the robot accelerates, decelerates, or turns, or when the road surface is rugged, the tray 1 experiences a horizontal movement with a smoother and less acceleration, and thus the liquid in the container on the tray 1 is not prone to spill out. Such floating also results in a damping effect which can attenuate the floating amplitude and reduce shaking of the liquid in the container.

Embodiment 3

Based on Embodiment 1, as shown in FIGS. 13-18, in the present embodiment, the mounting bracket 2 and the pulling rebounding portion 4 in another structural form are provided.

Figure 13:
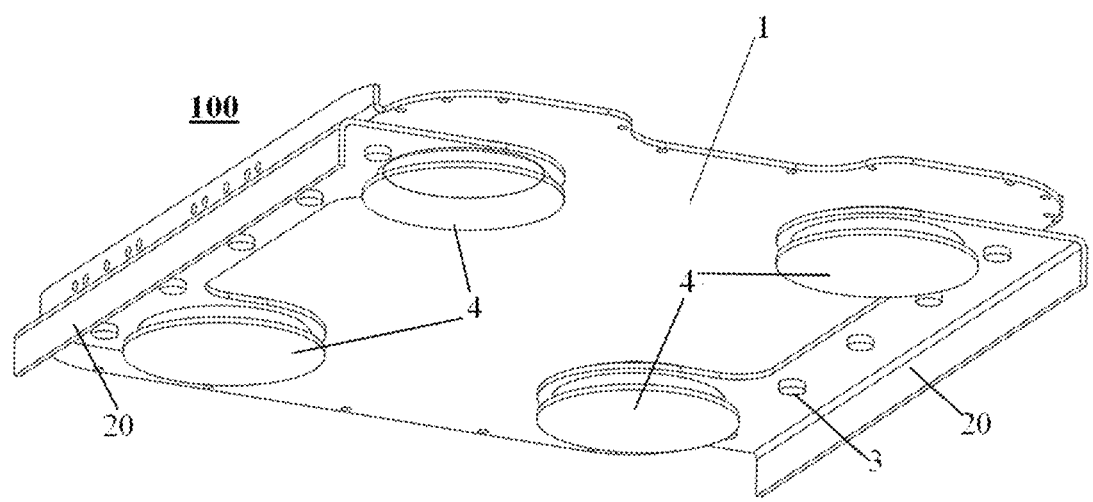
FIG. 13 is a perspective view of a floating tray mechanism as provided in a third embodiment of the present application.
Figure 14:
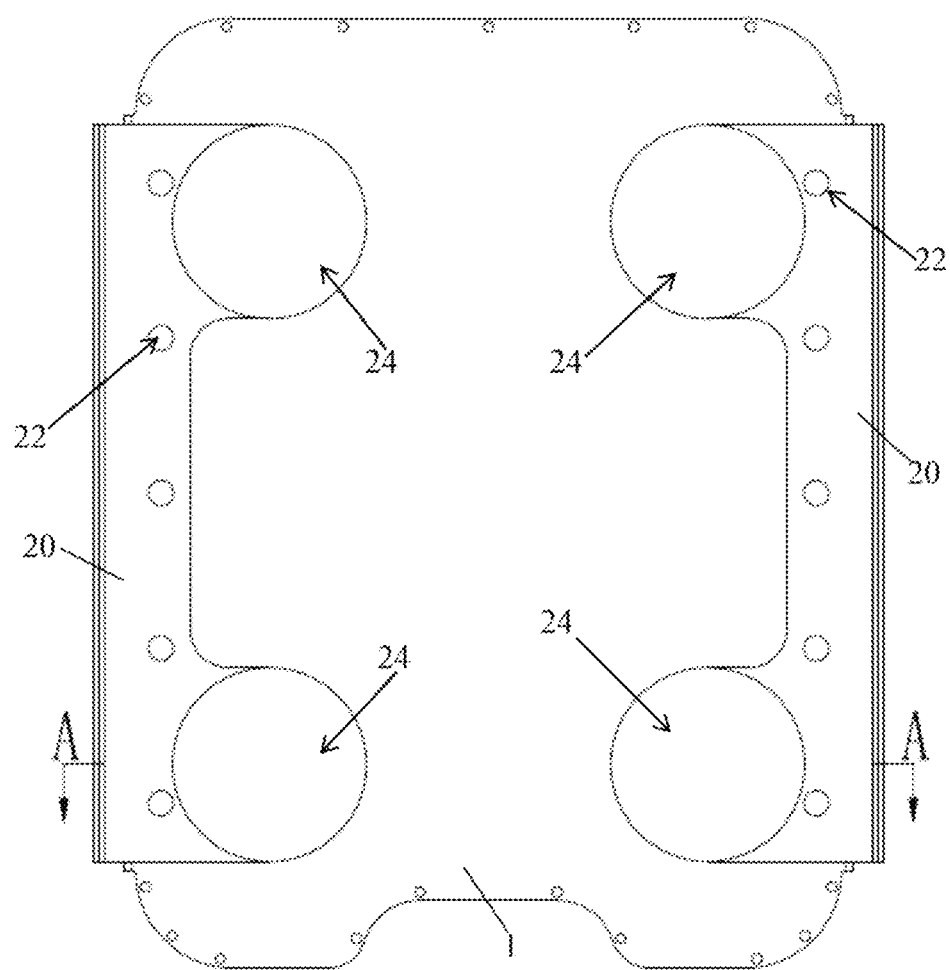
FIG. 14 is a bottom view of the structure corresponding to FIG. 13.
Figure 15:
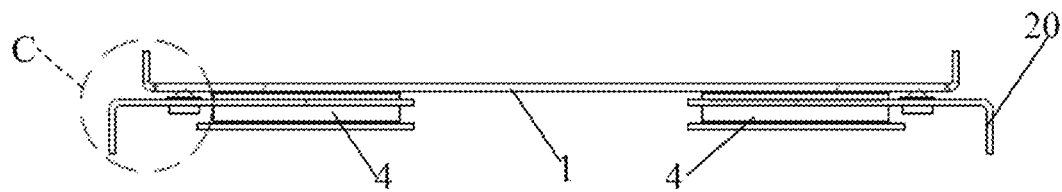
FIG. 15 is a front view of the structure corresponding to FIG. 13.
Figure 16:
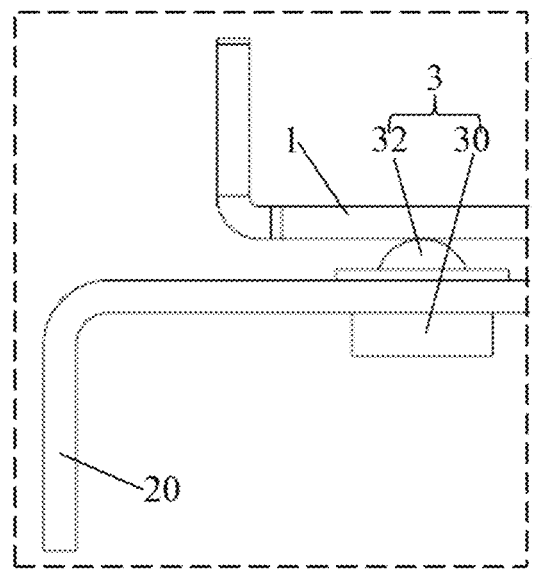
FIG. 16 is an enlarged structural diagram corresponding to C in FIG. 15.
Figure 18:
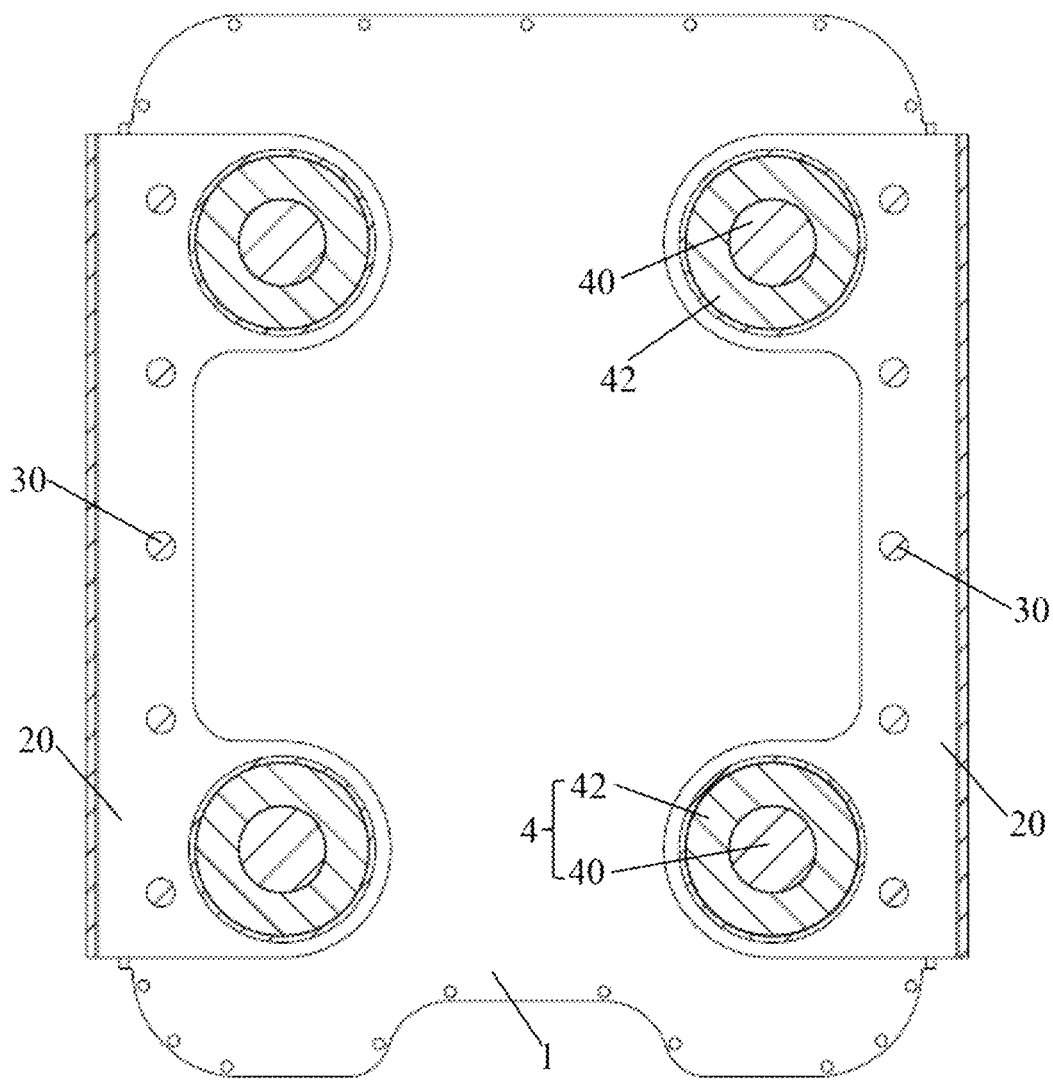
FIG. 18 is a section view of the structure corresponding to B-B in FIG. 17.
Figure 19:
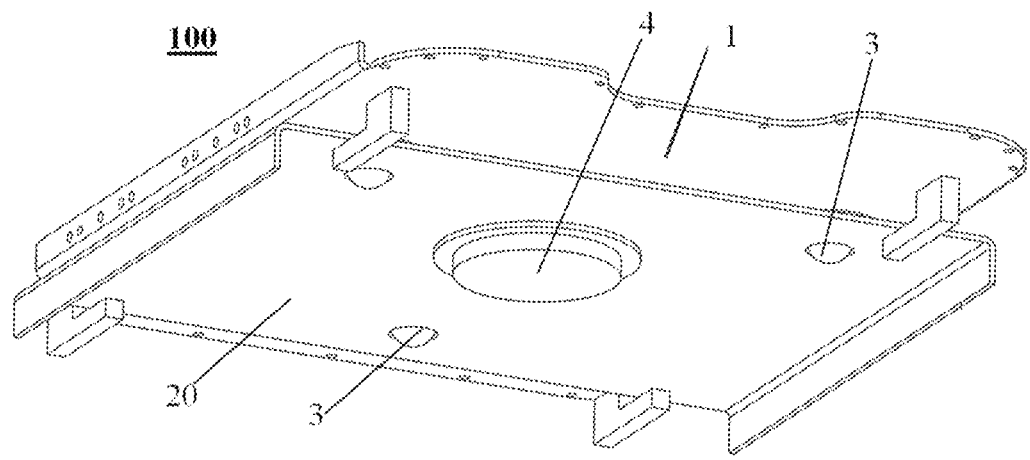
FIG. 19 is a perspective view of a floating tray mechanism as provided in a fourth embodiment of the present application.
Figure 20:
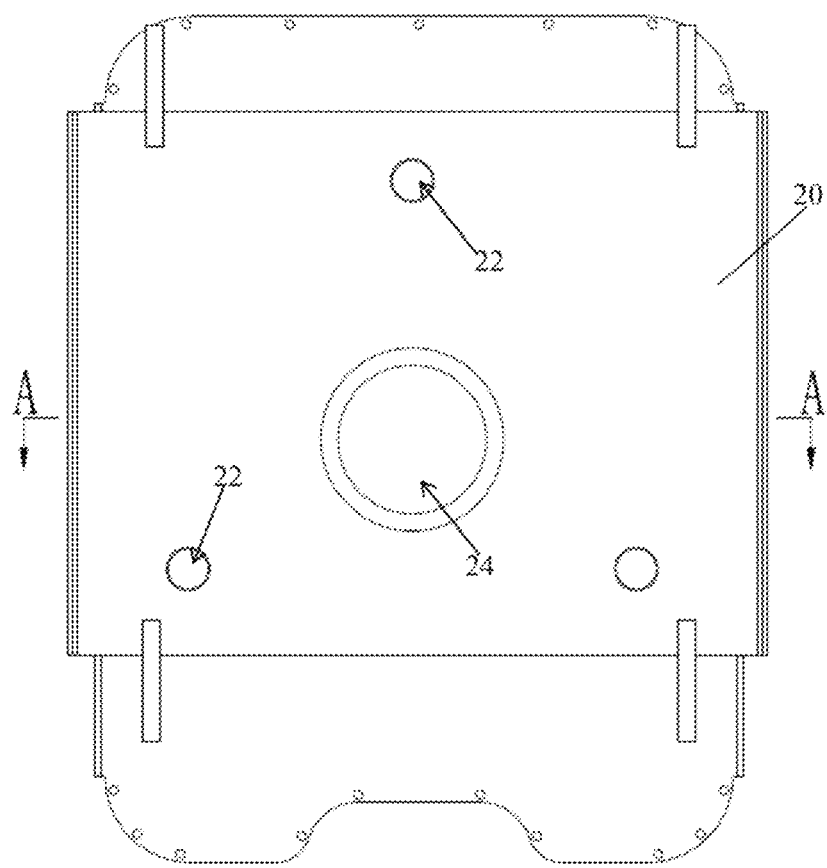
FIG. 20 is a bottom view of the structure corresponding to FIG. 19.
Figure 21:
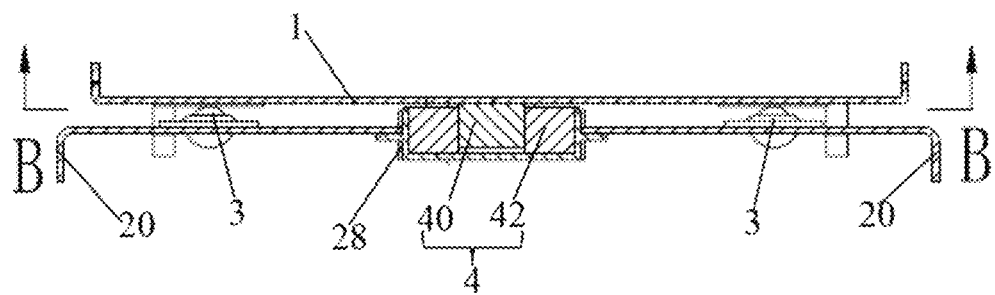
FIG. 21 is a section view of the structure corresponding to A-A in FIG. 20.
Figure 22:
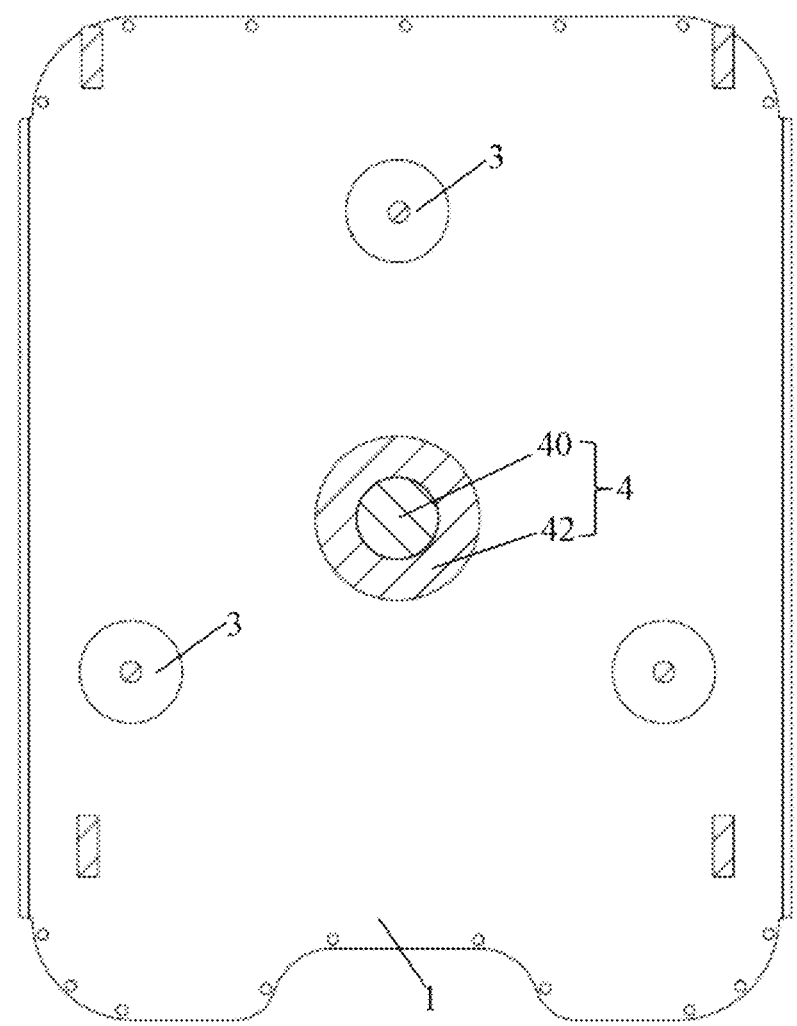
FIG. 22 is a section view of the structure corresponding to B-B in FIG. 21.
Figure 23:
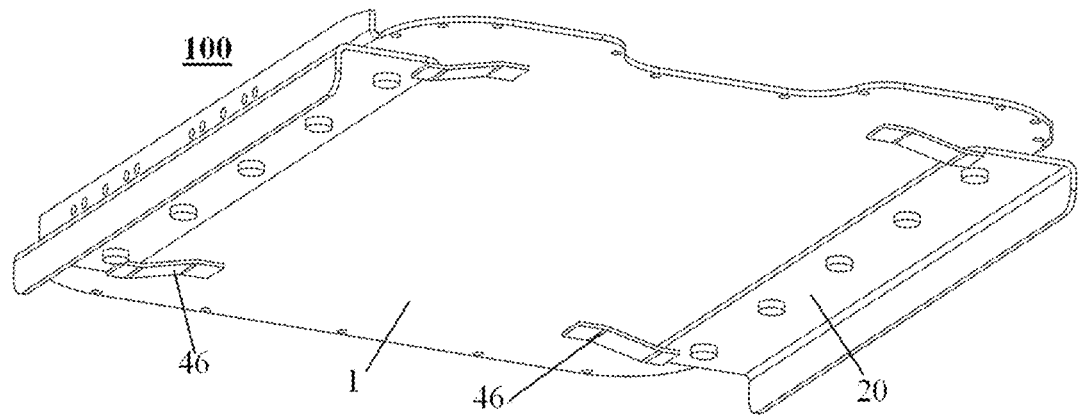
FIG. 23 is a perspective view of a floating tray mechanism as provided in a fifth embodiment of the present application.
Figure 24:
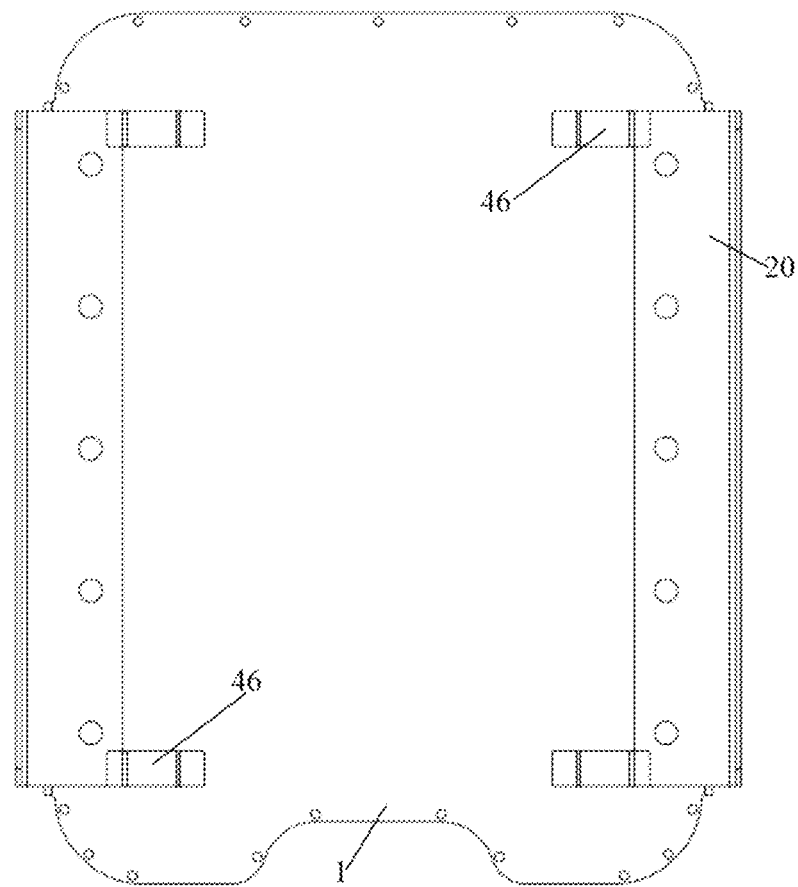
FIG. 24 is a bottom view of the structure corresponding to FIG. 23.
Figure 25:
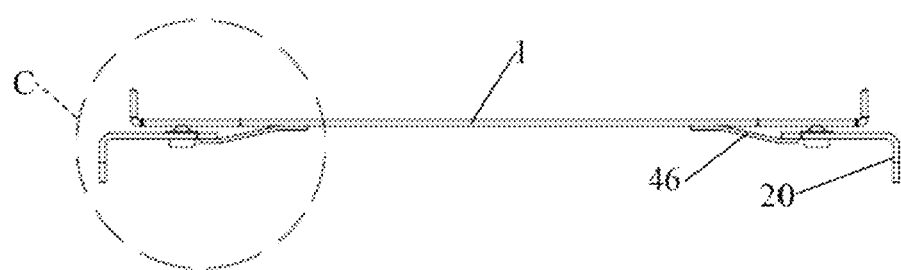
FIG. 25 is a front view of the structure corresponding to FIG. 23.
Figure 26:
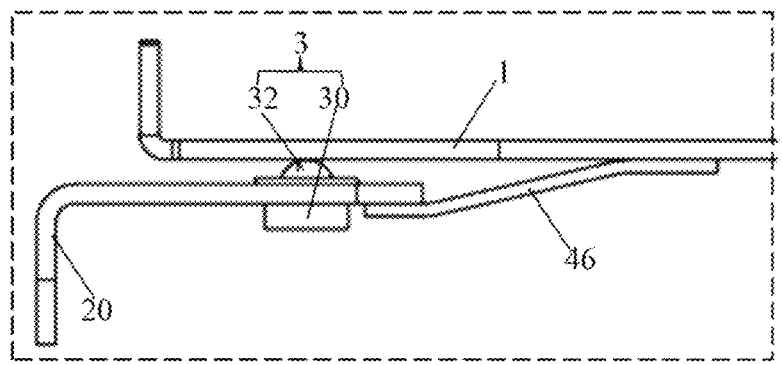
FIG. 26 is an enlarged structural diagram corresponding to C in FIG. 25.

The first improved difference from Embodiment 1 is that, as shown in FIGS. 13, 14 and 18, two mounting support plates 20 are respectively arranged to support two sides of the tray 1, and a plurality of floating mounting holes 22 are respectively arranged on each mounting support plate 20 in a spaced manner (near the edge position). As shown in FIGS. 15 and 16, in the position of each floating mounting hole 22, a universal ball 32 is still provided as the sliding fulcrum, and two ends of each mounting support plate 20 are respectively provided with a rebounding mounting port 24, that is, one pulling rebounding portion 4 is provided respectively at each of the four corner positions.

Figure 17:
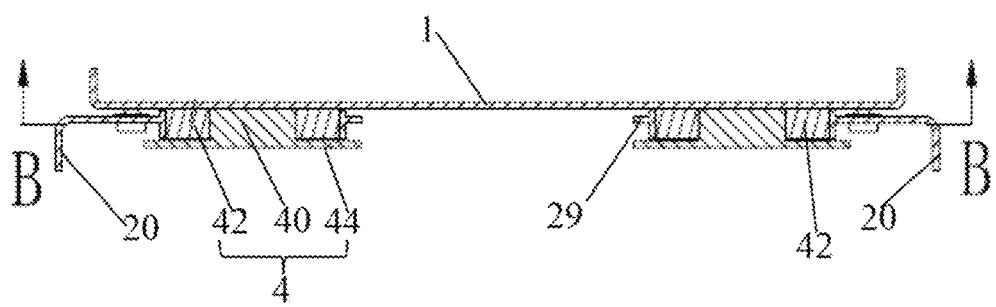
FIG. 17 is a section view of the structure corresponding to A-A in FIG. 14.

The second improved difference from Embodiment 1 is that, as shown in FIGS. 14 and 17, a ring sleeve 29 is fixedly mounted at the rebounding mounting port 24, one end of the connecting shaft 40 is provided with a flange cover 44 and the connecting shaft 40 movably passes through the ring sleeve 29, the rebounding cushion 42 is annularly arranged between the connecting shaft 40 and an inner wall of the ring sleeve 29, the flange cover 44 presses against and covers an end of the ring sleeve 29, and the other end of the connecting shaft 40 passes through out of the other end of the ring sleeve 29 and is fixedly connected to the lower surface of the tray 1. Thus, the pulling rebounding portion 4 in another structural form is formed.

Other structures are configured to be substantially same as those in Embodiment 1, and will not be described repeatedly herein.

In the present embodiment, the flange cover 44 is added to the connecting shaft 40 to prevent disengagement of the tray 1 due to vibration/shock from the mounting bracket 2, thus replacing/omitting the limiting clamping block 26 provided at the lower surface of the tray 1 in Embodiment 1. Moreover, the pulling rebounding portions 4 located at the four corner positions can produce better rebounding pulling force for the tray 1, thus making the damping and inertia attenuation effect better.

Embodiment 4

Based on Embodiment 1, as shown in FIGS. 19-22, in the present embodiment, the mounting bracket 2 in another structural form is provided.

The improved difference from Embodiment 1 is that, in the present embodiment, an integrated mounting support plate 20 is provided below the tray 1. The mounting support plate 20 is provide at its center with at least one rebounding mounting port 24, and multiple floating mounting holes 22 are uniformly distributed around the rebounding mounting port 24. Preferably, the mounting support plate 20 is provided at its center with only one pulling rebounding portion 4, and three floating contacting portions 3, each having a universal ball 32, are uniformly distributed respectively around the pulling rebounding portion 4.

Other structures are configured to be substantially same as those in Embodiment 1, and will not be described repeatedly herein.

The present embodiment as an equivalent replacement form of Embodiment 1, makes the whole structure simpler, for the on-site personnel to choose.

Embodiment 5

Based on Embodiment 1, as shown in FIGS. 23-26, in the present embodiment, the mounting bracket 2 and the pulling rebounding portion 4 in another structural form are provided.

The improved difference from Embodiment 1 is that, in the present embodiment, specifically, the pulling rebounding portion 4 uses an elastic material 46 in a strip shape as the rebounding fulcrum. One end of the elastic material 46 is fixedly connected to a lower surface of the mounting bracket 2 and the other end is fixedly connected to a lower surface of the tray 1, and the tray 1 is simultaneously pulled and pressed by the elastic material 46. Relatively preferably, the elastic material 46 is a tension spring or an elastic rubber with both ends bent.

Other structures are configured to be substantially same as those in Embodiment 1, and will not be described repeatedly herein.

Thus, when the tray 1 floats, the elastic material 46 in a strip shape can provide rebounding force. Moreover, since the fixed end of the elastic material 46 in a strip shape on the tray 1 is higher than that on the mounting support plate 20, the elastic material 46 can also provide a downward pulling force to the tray 1 to prevent the tray 1 from vibrating upwards and disengaging.

Thus, by using such simple elastic material 46 in a strip shape to replace the pulling rebounding portion 4 in a circular disk shape in Embodiment 1, it is not necessary to form the rebounding mounting port 24 on the mounting bracket 2, and the limiting clamping block 26 provided at the lower surface of the tray 1 can be omitted, significantly simplifying the whole structure.

Embodiment 6

Figure 27:
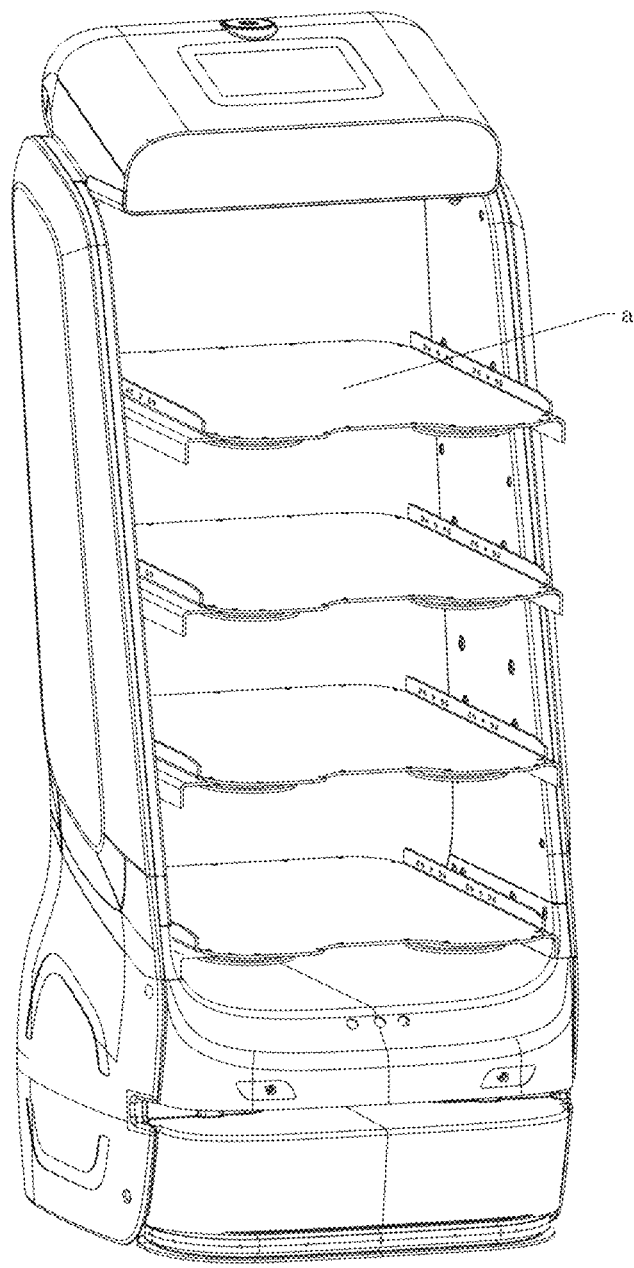
FIG. 27 is a perspective view of a robot mounted with the floating tray mechanism in the present application.

As shown in FIG. 27, the present embodiment provides a robot, comprising a body frame 102 and any one of the floating tray mechanism 100 described above. In the floating tray mechanism 100, the two sides of the mounting bracket 2 are respectively mounted on the body frame 102. Herein, the mounting bracket 2 can be configured to be detachably mounted to the body frame 102. In the present embodiment, the body frame 102 comprises two side walls opposite to each other, and the two sides of the mounting bracket 2 may be respectively mounted to the side walls on the corresponding sides. The floating tray mechanism 100 in the present application may be directly mounted onto a body of a prior robot as an individual mounting module, or even may be additionally mounted directly onto a tray of a prior robot.

With such robot, the fluid goods will not spill out of the tray, and the delivery quality is high.

In addition, the above is only for the preferred embodiments of the present application as well as the technical principles as used. Those skilled in the art will understand that the present application will not be limited to the specific embodiments as described herein, and various apparent changes, re-adjustment and replacement solutions can be made by those skilled in the art without departing from the protection scope of the present application. Therefore, though the present application is explained in detail by means of the above embodiments, the present application is not only limited to the above embodiments. It can cover many other equivalent embodiments without departing from the concept of the present application. The scope of the present application is defined by the following claims.

What is claimed is:

1. A floating tray mechanism, comprising a tray and a mounting bracket, wherein the mounting bracket supports the tray to be mounted on a robot frame;

the floating tray mechanism further comprises a floating contacting portion and a pulling rebounding portion, the floating contacting portion is provided on one of the tray and the mounting bracket, and the tray is movably supported on the mounting bracket through the floating contacting portion, the pulling rebounding portion is configured to be able to pull the tray back to an initial position of translation when the tray moves relative to the mounting bracket;

the mounting bracket is provided with the floating contacting portion and the pulling rebounding portion, the floating contacting portion is in point-surface contact or surface-surface contact with the tray, and the pulling rebounding portion is connected to the tray and is able to make the tray back to the initial position of translation by rebounding force;

the mounting bracket comprises a mounting support plate for supporting the tray, and the mounting support plate is provided with a floating mounting hole; and the floating contacting portion comprises a ball support seat and a universal ball, the ball support seat is locked and mounted to the floating mounting hole, the universal ball is rotatably mounted on the ball support seat, and the tray is slidably supported on the universal ball.

2. The floating tray mechanism according to claim 1, wherein the floating contacting portion comprises a sliding friction layer which is in surface-surface contact with the tray.

3. The floating tray mechanism according to claim 2, wherein the sliding friction layer is a Teflon plate and is fixedly mounted to an upper surface of the mounting bracket, and a lower surface of the tray is slidably pressed on the Teflon plate.

4. The floating tray mechanism according to claim 1, wherein a damping cushion is provided at a contact portion between a lower surface of the tray and the universal ball.

5. The floating tray mechanism according to claim 1, wherein the pulling rebounding portion comprises an elastic material in a strip shape, one end of the elastic material is fixedly connected to a lower surface of the mounting bracket, the other end of the elastic material is fixedly connected to a lower surface of the tray, and the tray is simultaneously pulled and pressed through the elastic material.

6. The floating tray mechanism according to claim 5, wherein the elastic material is a tension spring or a bent elastic rubber.

7. The floating tray mechanism according to claim 1, wherein the mounting bracket comprises a mounting support plate for supporting the tray, and the mounting support plate is provided with a rebounding mounting port;

the pulling rebounding portion comprises an elastic pulling element, one end of the elastic pulling element is movably mounted to the rebounding mounting port and the other end of the elastic pulling element is connected to a lower surface of the tray.

8. The floating tray mechanism according to claim 1, wherein the mounting bracket comprises a mounting support plate for supporting the tray, and the mounting support plate is provided with a rebounding mounting port;

the pulling rebounding portion comprises a connecting shaft and a rebounding cushion, one end of the connecting shaft is movably arranged in the rebounding mounting port, the other end is fixedly connected to a lower surface of the tray, and the rebounding cushion is arranged between the rebounding mounting port and the connecting shaft.

9. The floating tray mechanism according to claim 8, wherein a cavity groove body is fixedly mounted at the rebounding mounting port, the end of the connecting shaft far from the tray is movably arranged in the cavity groove body, the rebounding cushion is annularly arranged between the connecting shaft and a cavity inner wall of the cavity groove body, the rebounding cushion is configured to be pressed to deform with movement of the connecting shaft until the deformation is restored, and the tray turns to the initial position through the rebounding cushion.

10. The floating tray mechanism according to claim 8, wherein a ring sleeve is fixedly mounted at the rebounding mounting port, the end of the connecting shaft far from the tray passes through out of the ring sleeve and the end of the connecting shaft passing through the ring sleeve is provided with a flange cover, the rebounding cushion is annularly arranged between the connecting shaft and an inner wall of the ring sleeve, and the flange cover presses against and covers an end of the ring sleeve.

11. The floating tray mechanism according to claim 1, wherein the tray is provided with a rebounding mounting port; the pulling rebounding portion comprises a connecting shaft and a rebounding cushion, one end of the connecting shaft is movably arranged in the rebounding mounting port and the other end is fixedly connected to the mounting bracket, and the rebounding cushion is arranged between the rebounding mounting port and the connecting shaft.

12. The floating tray mechanism according to claim 1, wherein the floating contacting portion comprises a ball support seat and a universal ball rotatably mounted on the ball support seat; the ball support seat is provided on one of the mounting bracket and the tray, and the other of the mounting bracket and the tray is movable relative to the universal ball.

13. The floating tray mechanism according to claim 1, wherein the floating contacting portion comprises a sliding friction layer provided on one of the mounting bracket and the tray, and the other of the mounting bracket and the tray is movable relative to the sliding friction layer.

14. The floating tray mechanism according to claim 1, wherein the floating tray mechanism further comprises a limiting clamping element for preventing disengagement of the tray from the mounting bracket.

15. The floating tray mechanism according to claim 14, wherein the limiting clamping element is a limiting clamping block which is fixed to the lower surface of the tray and comprises a horizontally extended clamping mouth section, with a clamping mouth gap between the clamping mouth section and the tray, the clamping mouth section is configured to clamp a mounting support plate of the mounting bracket below, and the tray limits the mounting bracket through the clamping mouth gap.

16. The floating tray mechanism according to claim 1, wherein two opposite sides of the tray are respectively provided with the floating contacting portion, and two opposite sides of the tray are respectively provided with the pulling rebounding portion.

17. The floating tray mechanism according to claim 1, wherein the pulling rebounding portion is arranged corresponding to a middle position of the tray, and multiple floating contacting portions are arranged around the pulling rebounding portion at intervals.

18. A robot, comprising a body frame and the floating tray mechanism according to claim 1.

* * * * *